(12) United States Patent
McLean (10) Patent No.: US 11,334,749 B2
(45) Date of Patent: May 17, 2022

(54) ASSIGNING AUDIBLE ALERTS AMONG CO-LOCATED APPLIANCES

(71) Applicant: Lenovo Enterprise Solutions (Singapore) Pte. Ltd., Singapore (SG)

(72) Inventor: James G. McLean, Raleigh, NC (US)

(*) Notice: Subject to any disclaimer, the term of this patent is extended or adjusted under 35 U.S.C. 154(b) by 173 days.

(21) Appl. No.: 16/915,974

(22) Filed: Jun. 29, 2020

(65) Prior Publication Data
US 2021/0406536 A1 Dec. 30, 2021

(51) Int. Cl.
| | |
|---|---|
| G06F 16/683 | (2019.01) |
| G06F 16/65 | (2019.01) |
| G08B 3/10 | (2006.01) |
| H04L 67/303 | (2022.01) |
| G06K 9/00 | (2022.01) |
| G10H 1/00 | (2006.01) |

(52) U.S. Cl.
CPC ......... *G06K 9/00536* (2013.01); *G06F 16/65* (2019.01); *G06F 16/683* (2019.01); *G08B 3/1025* (2013.01); *G08B 3/1083* (2013.01); *G10H 1/0008* (2013.01); *H04L 67/303* (2013.01); *G10H 2240/141* (2013.01)

(58) Field of Classification Search
None
See application file for complete search history.

(56) References Cited

U.S. PATENT DOCUMENTS

| | | | | |
|---|---|---|---|---|
| 2005/0243996 | A1* | 11/2005 | Fitchmun | H04M 3/42051 379/418 |
| 2009/0239497 | A1* | 9/2009 | Sennett | H04W 76/50 455/404.1 |
| 2011/0029875 | A1* | 2/2011 | Milch | B60R 25/104 711/E12.001 |
| 2014/0062697 | A1* | 3/2014 | Ramaswamy | H04M 1/72448 340/540 |
| 2014/0097953 | A1* | 4/2014 | Jelveh | G08B 25/14 340/517 |
| 2021/0071347 | A1* | 3/2021 | Pattarello | D06F 58/34 |

* cited by examiner

*Primary Examiner* — Hemant S Patel
(74) *Attorney, Agent, or Firm* — Jeffrey Streets (57) ABSTRACT

Smart appliances communicate over a local area network. A selected sound palette includes multiple soundfile groups that each include multiple soundfiles. Each soundfile within a given sound palette has a first common sound attribute, each soundfile within a given soundfile group has a second common sound attribute, each soundfile within a given soundfile group has a variation of the second common sound attribute that is unique among the soundfile groups, and each soundfile within a given soundfile group has a unique variation of a third common sound attribute. One soundfile group may be assigned to each of the appliances, and one soundfile within each soundfile group may be assigned to an alert type. The assigned soundfile group is sent to the appliance with identification of the alert type to which each soundfile is assigned, such that the appliance may use an assigned soundfile for audible alerts.

20 Claims, 6 Drawing Sheets

| Palette: Bamboo | | | | |
|---|---|---|---|---|
| Participant | Event | Soundfile | Assignment | |
| Washer | Cycle complete | Bamboo_Washer_Cycle.mp3 | Samsung WF42H5000AW SN 1234 | |
| | Add softener | Bamboo_Washer_Soft.mp3 | Samsung WF42H5000AW SN 1234 | |
| | Trouble | Bamboo_Washer_Trouble.mp3 | Samsung WF42H5000AW SN 1234 | |
| Dryer | Cycle complete | Bamboo_Dryer_Cycle.mp3 | Samsung DV42H5000EW SN 4321 | |
| | Tumbling | Bamboo_Dryer_Tum.mp3 | Samsung DV42H5000EW SN 4321 | |
| | Trouble | Bamboo_Dryer_Trouble.mp3 | Samsung DV42H5000EW SN 4321 | |
| Refrigerator | Door open reminder | Bamboo_Ref_Door.mp3 | (UNASSIGNED) | |
| | Filer alert | Bamboo_Ref_Alert.mp3 | (UNASSIGNED) | |
| | Trouble | Bamboo_Ref_Trouble.mp3 | (UNASSIGNED) | |
| Microwave | Cooking complete | Bamboo_Micro_Done.mp3 | KitchenAid KMHS120ESS SN 9876 | |
| | Action required | Bamboo_Micro_Alert.mp3 | KitchenAid KMHS120ESS SN 9876 | |
| | Trouble | Bamboo_Micro_Trouble.mp3 | KitchenAid KMHS120ESS SN 9876 | |

ASSIGNING AUDIBLE ALERTS AMONG CO-LOCATED APPLIANCES

BACKGROUND

The present disclosure relates to appliances and other devices that produce audible alerts.

BACKGROUND OF THE RELATED ART

The number of appliances and other household electronic devices in the home has increased significantly in recent years. These appliances and electronic device may help a person to perform a domestic task or chore. Examples of appliances include a stove or oven for assisting with cooking, a washing machine for assisting with cleaning clothes and fabrics, a dishwasher for assisting with cleaning dishes and utensils, a coffee machine for making coffee, and a refrigerator for storing food and making ice. Other household electronic devices include water heaters, air conditioners, irrigation system controllers, video doorbells, smart speakers, televisions, computers, printers, scanners, alarm systems, and baby monitors. The available types of appliances and other household electronic devices is continuing to expand.

Many appliances and other devices have been designed to use audible sound to convey information to a user about the status of the appliance or device. However, the amount and complexity of information that these appliances and devices render to the user has increased as more options and features are built into the appliances and devices. As a result, some appliances and devices have replaced simple beeps and buzzes with a series of tones to indicate a wide variety of information to the user.

A beneficial aspect of using audible sounds to provide an alert is that a user may be made aware of the status of the appliance or device without having to be directly in front of a display formed on the appliance or device. If a user does not want the audible alerts, some appliances and devices allow the user to silence the alerts. However, silencing the alerts may prevent useful information from timely reaching the user.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations comprise establishing network communication with a plurality of appliances over a local area network, wherein each appliance is a smart appliance including a processor, memory, a network interface, and a data storage device with capacity to store a plurality of soundfiles. The operations further comprise accessing a sound palette including a plurality of soundfile groups, each soundfile group including a plurality of soundfiles; wherein, for each of the sound palettes, each soundfile within the sound palette has a first common set of sound attributes; wherein, for each of the soundfile groups within a particular sound palette, each soundfile within the soundfile group has a second common set of sound attributes; wherein, for each soundfile group within a particular palette, each soundfile within the soundfile group has a variation of the second common set of sound attributes that is unique among the plurality of soundfile groups within the sound palette; and wherein each soundfile within a soundfile group has a unique variation of a third common set of sound attributes. The operations further comprise assigning, for each of the appliances, one of the soundfile groups to the appliance, wherein each soundfile group is assigned to only one appliance; assigning, for each of the assigned soundfile groups, one of the soundfiles to an alert type, wherein each soundfile is assigned to only one alert type; and sending, for each of the appliances, the assigned soundfile group to the appliance with identification, for each soundfile within the assigned soundfile group, of the alert type to which the soundfile is assigned.

DETAILED DESCRIPTION

Some embodiments provide a computer program product comprising a non-volatile computer readable medium and non-transitory program instructions embodied therein, the program instructions being configured to be executable by a processor to cause the processor to perform various operations. The processor may be installed in a main appliance among a plurality of appliances, such that the various operations may be performed by the main appliance. The operations comprise establishing network communication with the plurality of appliances over a local area network, wherein each appliance is a smart appliance including a processor, memory, a network interface, and a data storage device with capacity to store a plurality of soundfiles. The operations further comprise accessing a sound palette including a plurality of soundfile groups, each soundfile group including a plurality of soundfiles; wherein, for each of the sound palettes, each soundfile within the sound palette has a first common set of sound attributes; wherein, for each of the soundfile groups within a particular sound palette, each soundfile within the soundfile group has a second common set of sound attributes; wherein, for each soundfile group within a particular palette, each soundfile within the soundfile group has a variation of the second common set of sound attributes that is unique among the plurality of soundfile groups within the sound palette; and wherein each soundfile within a soundfile group has a unique variation of a third common set of sound attributes. The operations further comprise assigning, for each of the appliances, one of the soundfile groups to the appliance, wherein each soundfile group is assigned to only one appliance; assigning, for each of the assigned soundfile groups, one of the soundfiles to an alert type, wherein each soundfile is assigned to only one alert type; and sending, for each of the appliances, the assigned soundfile group to the appliance with identification, for each soundfile within the assigned soundfile group, of the alert type to which the soundfile is assigned.

Some embodiments may be implemented among a plurality of residential or home appliances. A home appliance is any device that accomplishes a household function, either in whole or in part. The plurality of home appliances may be selected from major appliances, small appliances and consumer electronics. Non-limiting examples of a major appliance include a refrigerator, freezer, water cooler, stove, oven, cooktop, microwave oven, washing machine, clothes dryer, dishwasher, air conditioner, and water heater. Non-limiting examples of a small appliance include a coffeemaker, toaster oven, slow cooker, robotic vacuum, humidifier, irrigation system controller, smart locks, alarm systems, light fixture, and fan. Non-limiting examples of consumer electronics include entertainment devices such as televisions, digital video disk players, video game consoles, and augmented reality and virtual reality headsets; communications devices such as telephones, smartphones, smartwatches, video doorbells; home-office devices such as desktop computers, printers, scanners; and other devices such as smart speakers, and baby monitors. It should be recognized that embodiments may also be implemented with appliances in other settings other than a residence, such as a business or public setting.

Some embodiments may be used in any setting where there are two or more appliances, but embodiments are preferably used in settings where two or more appliances are colocated. The term "colocated" is used herein to mean that two appliances are located in the same place or vicinity. The scope or range of locations that are found to be in the "same place or vicinity" may vary according to the implementation. However, in the present context of appliances that produce audible alerts, two appliances are colocated if the two appliances are separated from each other by no more distance than would allow the audible alerts from the two appliances to be simultaneously heard from a single location. For example, if two appliances can each be heard by a person up to 50 feet away, then it is possible for that person to simultaneously hear audible alerts from both appliances if the appliances are separated by 100 feet if the person is located 50 feet away from each appliance. Accordingly, the two appliances are colocated. As a practical matter, two appliances may be colocated if they are both located within a defined space, such as an individual residence (e.g. a house or an apartment). Furthermore, a large number of appliances may be considered to be colocated even if not all appliances can be heard from any one location, so long as two or more of the appliances can be heard in a majority of a defined space. It should also be recognized that embodiments may also be implemented in other environments, such as a business, where the appliances may be office appliances such as copiers, printers, phones, doorbells and the like.

Furthermore, the identity of appliances that have their audible alerts coordinated may be determined by their inclusion in a local area network or personal area network. As an alternative or additional requirement, the appliances that have their audible alerts coordinated may be determined by their inclusion in a list of appliances, where the list may be maintained by one of the appliances designated as a main appliance. Optionally, each appliance may be identified by a network address, such as an Internet Protocol (IP) address or a Media Access Control (MAC) address.

Each appliance may include a processor, memory, network adapter and data storage device. However, each appliance may include further components that enable the appliance to perform a particular task or chore. For example, a smart speaker may further include a speaker and a microphone; a refrigerator may further include a door sensor, light, refrigerant compressor and thermometer; and a washing machine may further include input and output valves, water pump, water heater, lid/door sensor, control panel and drive motor. Still, it is the processor that controls the operation of the appliance using program instructions, the network adapter that enables the processor to communicate with other appliances over a network, and the data storage device that enables storage of one or more soundfiles.

In some embodiments, the main appliance may communicate with the other appliances using any available network standard. For example, the main appliance may communicate with other appliances over a local area network (LAN), including a wired network and/or a wireless network. A non-limiting example of a wired network may be implemented according to the Ethernet standard and a non-limiting example of a wireless network may be implemented according to the WiFi standard. For non-network-connected appliances, more direct connections, such as wired file transfer, NFC transfer, or any other communication method, may be used.

In some embodiments, the operations may further include discovering each of the plurality of appliances on the local area network, and identifying, for each of the plurality of appliances, each alert type that the appliance outputs in response to detecting an event. The main appliance may perform these operations by polling the network for appliances and querying the alert types used by each of the discovered appliances. Alternatively, a user may manually collect and enter a list of appliances, a list of alert types used by each appliance, and an Internet Protocol (IP) address or Media Access Control (MAC) address for each appliance.

In some embodiments, a given soundfile may provide a meaningful audible alert by combining a plurality of sound elements (or themes) within a sound palette. For example, a first sound element (such as a short melody sequence) within a soundfile may be used to signify an appliance identity, and a second sound element (such as a second short melody sequence) within a soundfile may be used to signify an alert type. If each appliance is assigned an unique first sound element that signifies the appliance identity, and if each alert type is assigned a unique second sound element, then an audible alert for a given appliance experiencing a given alert type may include a first sound element signifying the given appliance followed by a second sound element signifying the given alert type. A person may quickly learn that the first portion of an audible alert identifies an appliance and the second portion of the audible alert indicates the alert type. For example, a plurality of unique four-note melodies may be assigned to each of a plurality of appliances, and a plurality of unique three-note melodies may be assigned to each of a plurality of alert types. In this example, an audible alert may have seven notes, where the first four notes signify the appliance identity and the next three notes signify the alert type. It should be understood that the same three-note melody may signify the same alert type among each of the appliances (i.e., a first three-note sequence might stand for "completed" regardless of the appliance identity, a second three-note sequence might be used for "trouble", and a third three-note sequence may signify "action needed"). Furthermore, an appliance identity and/or alert type may be indicated using any other sound attribute. For example, appliance identity could be indicated using a unique timbre, such that the audible alerts from each appliance would sound like a different musical instrument.

In some embodiments, the operations may include selecting one or more sound attributes for inclusion in the first common set of sound attributes, one or more sound attributes for inclusion in the second common set of sound attributes, and one or more attributes for inclusion in the third common set of sound attributes. Using the selected sound attributes, the plurality of soundfiles may be constructed or produced, where each soundfile includes the first common set of sound attributes, the variation of the second common set of sound attributes that is unique to the soundfile group in which the soundfile is included, and the variation of the third common set of sound attributes that is unique to alert type to which the soundfile is assigned. Accordingly, the soundfiles do not have to be predetermined, but may be created based on the user input indicating which sound attributes should be used in the first, second and third common sets of sound attributes. Alternatively, the soundfiles may be predetermined.

In some embodiments, the variation of the second common set of sound attributes that is unique to a soundfile group may be used to signify an appliance identity, where each variation identifies a different appliance. Similarly, the unique variation of the third common set of sound attributes may signify an alert type detected by the appliance. Optionally, the unique variation of the third common set of sound attributes may signify the same alert type for each of the soundfile groups. For example, two or more of the plurality of appliances may have a common event type, where each of the two or more appliances having the common event type may include a soundfile having the same variation of the third common set of sound attributes to signify the common event type. In one option, the third common set of sound attributes may include one or more of a musical key, melody, tempo, rhythm, harmony, counterpoint, timbre, musical genre and/or orchestration/instrumentation.

In some embodiments, a main repository stores a plurality of soundfiles that can be used by an appliance to produce an audible alert. The main repository may be stored in a data storage device of an application server, online store, local appliance or other accessible data storage. A user may listen to any or all of the soundfiles in the main repository, then select one or more soundfiles to download. In one option, a soundfile may be directly downloaded or transferred from the main repository to an appliance. In another option, a user may download one or more desired soundfiles, such as one or more sound palette, to one of the networked appliances, such as a home computer, smartphone, or smart speaker.

The main repository may organize the soundfiles into a plurality of "sound palettes", which may also be referred to as "sound themes" or "sound styles." Each sound palette may include a plurality of soundfiles, where each soundfile with a sound palette has a first common sound attribute. Furthermore, each sound palette may include a plurality of soundfile groups, where each soundfile group may include a plurality of the soundfiles. While all soundfiles within a sound palette have a first common sound attribute, all of the soundfiles within a soundfile group may also have a second common sound attribute. However, the second common sound attribute of the soundfiles within any given soundfile group may be unique relative to the second common sound attribute of each of the other soundfile groups within the sound palette. Still further, each soundfile within a soundfile group may have a third sound attribute that is unique relative to the third sound attribute of each of the other soundfiles within the soundfile group. Accordingly, it should be appreciated that all soundfiles within a sound palette may have at least one sound attribute in common, that all soundfiles within a soundfile group may have at least two sound attributes in common, and each soundfile may have a unique combination of sound attributes. Preferably, the sound attributes are selected so that each soundfile can be heard clearly and distinctly, so that each soundfile has at least one attribute that clearly distinguishes that soundfile from each other soundfile.

In one non-limiting example, the second common set of sound attributes may include a first melody sequence and the third common set of sound attributes may include a second melody sequence subsequent to the first melody sequence. Accordingly, the first melody sequence may identify an appliance and the second melody sequence may identify an alert type. In another non-limiting example, the first common set of sound attributes may include a musical key in order to provide a cohesive sound across all appliances, the second common set of sound attributes may include a particular timbre to identify or signify an appliance, and the third common set of sound attributes may include a melody sequence to identify or signify an alert type. These and other configurations of the attributes may be implemented to provide a sound palette that provides a common "theme" while including soundfiles that identify an appliance and an alert type.

In some embodiments, the operations may include establishing a connection with a remote application server (serving as the main repository) storing a plurality of sound palettes, each sound palette may include a plurality of soundfile groups, and each soundfile group may include a plurality of soundfiles. For each of the sound palettes, each soundfile within the sound palette may have a first common set of sound attributes. For each of the soundfile groups within a particular sound palette, each soundfile within the soundfile group may have a second common set of sound attributes. For each soundfile group within a particular sound palette, each soundfile within the soundfile group may have a variation of the second common set of sound attributes that is unique among the plurality of soundfile groups within the sound palette. Each soundfile within a soundfile group may have a unique variation of a third common set of sound attributes. The operations may further include selecting a sound palette, and downloading the plurality of soundfiles within the selected sound palette. In one option, two or more of the sound palettes may have a unique variation within the first common set of sound attributes. In another option, two or more of the sound palettes have at least one different sound attribute within the first common set of sound attributes.

The audible alerts defined by the soundfiles within a particular sound palette are preferably created or selected to produce a harmonious overall affect. This harmonious affect may be experienced one audible alert at a time, or with a plurality of the audible alerts from different appliances occurring simultaneously. For example, the sounds produced by the soundfiles may be coordinated in one or more attributes, such as using only notes with a particular musical key (e.g. "C major" or "B♭ minor"), using only certain one or more instruments (e.g. string quartet, piano, guitar, synthesizer), using a select musical genre or style (e.g. samba, jazz, new age), having a geographic reference (e.g. eastern/ western tunings), or any other audible or musical attribute. It should be recognized that the consistent use of a first (set of one or more) sound attribute across all soundfiles within the sound palette provides a harmonious effect. The consistent use of a second (set of one or more) sound attribute across all soundfiles within a soundfile group provides an association between the audible alert that uses the second sound attribute and the appliance that issues the audible alert. Sound attributes that are not applied uniformly across the sound palette or a soundfile group may be varied from one soundfile to another soundfile to signify a particular alert type. In one non-limiting example, every soundfile in a given sound palette may use notes in the key of C major and have a tempo of 100 beats per minute; every soundfile in a given soundfile group may have a timbre characterized by the same musical instrument and musical genre or style; and each alert type (across all soundfile groups) may have the same number and pattern of notes (i.e., each "complete" alert may have four ascending notes C4 (middle C), E4, G4, and C5, where the number is used according to the International Standards Organization system for register designations).

In some embodiments, the user may accept default attributes of the soundfiles within a selected sound palette, or may modify one or more of the attributes of the soundfiles within the selected sound palette. Non-limiting examples of such attributes include the musical key (i.e., group of pitches or scale that form the basis of a musical composition), tempo (i.e., speed, such as beats per minute), dynamics (i.e., changes in loudness or volume), or instrumentation (i.e., timbre).

A user may select a sound palette from which to download a soundfile group for each of the colocated appliances having audible alerts that the user wants to coordinate. While the user may download an entire sound palette, the user may want to download only those soundfiles or soundfile groups that are currently being assigned to an appliance within the user's network. However, the user may have access to the entire sound palette and may select soundfile groups and/or individual soundfiles as desired.

In some embodiments, a soundfile group from a selected sound palette may be assigned to, or otherwise associated with, each of a plurality of colocated appliances. Then, the selected soundfile group may be sent to the appliance to which the soundfile group has been assigned. The soundfile may be sent over one or more network using an IP address and/or MAC address for the appliance. In one option, soundfiles are downloaded to a main appliance within the user's network. For example, the main appliance may, without limitation, be a computer, smartphone, smart speaker or small dedicated internet-connected appliance. The assignment of soundfile groups to particular colocated appliances may then be made on a soundfile management application executed by the main appliance, and the main appliance may then send the assigned soundfile group to the associated appliance. In an alternative option, a main appliance may access a remote application server over a wide area network, such as the Internet, and make the assignment of soundfile groups to appliances via a user interface to the remote application server. For example, the user may open a web browser on the main appliance and enter the uniform resource locator (URL) of the remote application server. The user may then select a sound palette, and assign soundfile groups within the selected sound palette to various appliances identified by their IP address. Accordingly, each soundfile group may be sent directly from the remote application server to the appliance to which the soundfile group has been assigned. Still further, the main appliance may make custom assignments of individual soundfiles to individual alerts on each individual appliance. In a further option, the main appliance may be used to instruct one or more individual appliances to obtain a particular soundfile or soundfile group from a remote application server. The individual appliance may then send a message to the remote application server requesting that the remote application server send the identified soundfile or soundfile group to the individual appliance. Preferably, the main appliance will instruct each of the individual colocated appliances to obtain a soundfile or soundfile group from a single sound palette in order to achieve a coordinated sound or musical theme.

A soundfile may be identified by a soundfile name, soundfile number or other associated identifier; a soundfile group may be identified by a soundfile group name, soundfile group number or other associated identifier; and a sound palette may be identified by a sound palette name, sound palette number or other associated identifier.

In some embodiments, a sound palette may have default settings in which a separate soundfile group is predesignated for a particular appliance type. Accordingly, if the user accepts the default settings, then the soundfile group that is predesignated for a particular appliance type may be provided to the particular appliance using only the sound palette identifier and the appliance type identifier. If each of the appliances are known to the main appliance by appliance type and network address, then a user selection of a sound palette may be the only additional information necessary for the soundfile management application to distribute an appropriate soundfile or soundfile group to each of the known appliances.

In some embodiments, the operations may include establishing a connection with a remote application server storing soundfiles that can be used by an appliance to produce an audible alert, providing the remote application server with an Internet Protocol address for use communicating with each of the appliances, identifying, for each of the appliances, a soundfile group to be used by the appliance, and instructing the remote application server to send, for each of the appliances, the identified soundfile group to the appliance.

A soundfile group includes one or more soundfile, where each soundfile within the soundfile group is designated for use as an audible alert in response to a particular alert type. Once a soundfile group has been received by an appliance, the appliance processor causes each soundfile within the soundfile group to be stored in a local data storage device, which is preferably a non-volatile memory. The appliance processor may subsequently access any particular one of the soundfiles within the soundfile group in response to detecting or reaching the alert type that is assigned, designated or otherwise associated with the particular soundfile. The processor may then cause a speaker or other audio output component to produce audible output using the soundfile.

In some embodiments, each appliance may be manufactured with, or otherwise previously provided with, a default soundfile group and/or a plurality of available soundfile groups, such that the user may then simply select a soundfile group among those available. In such an alternative, as soundfile groups are selected for use by one appliance, the main appliance or the particular appliance being assigned with the soundfile group may send out a message to other colocated appliances indicating that the soundfile group should not be reused by any other colocated appliances. Where each appliance stores a plurality of soundfile groups, each soundfile group may be associated with a different sound palette. Optionally, the operations may include receiving a user selection of a sound palette, instructing each appliance to use a soundfile group associated with the user selected sound palette for audible alerts, and preventing any two appliances from using the same soundfile group. One option for preventing any two appliances from using the same soundfile group includes sequentially assigning one of the soundfile groups to one or the appliances, and preventing any of the soundfile groups from being assigned to more than one of the appliances.

In some embodiments, one or more of the appliances may already be programmed with one or more sound attribute, such as one or more melody and/or one or more sound voicing or timbre. Accordingly, a user may cause the main appliance to provide an appliance with a new melody, a new voicing, an instruction of which melody to use, or an instruction of which voicing to use. For example, the main appliance may provide an individual appliance with a new melody without replacing the preprogrammed sound voicing, or the main appliance may provide an individual appliance with a new voicing without replacing the preprogrammed melody. In this manner, an appliance may retain a certain originality provided by one or more preprogrammed sound attribute, while also having one or more sound attribute modified to improve coordination of sound alerts among the appliances. Furthermore, where an appliance is programmed with multiple melodies and/or multiple voicings, the main appliance may merely instruct the appliance to use a particular one of its programmed melodies and/or instruct the appliance to use a particular one of its programmed voicings. Therefore, the main appliance may optionally provide one or more sound attribute, but may alternatively merely provide instructions regarding which preprogrammed sound attributes to use. Some embodiments may include any combination of sound attributes preprogrammed into the appliance and sound attributes provided to the appliance in accordance with various disclosed embodiments.

In some embodiments, a user may designate one or more appliance within the user's network to be a designated appliance for audible alerts from each of the other appliances. For example, the colocated appliances may include a smart speaker or other smart appliance with audio output capability, and the user may designate the smart speaker or the user's smartwatch or smartphone to serve as the designated appliance to output audible alerts from each of the other colocated appliances. Accordingly, the other colocated appliances may be instructed to send alert messages to the designated appliance for audible alerts in response to detect an alert condition, such that each colocated appliance may send each alert message to the designated appliance with or without muting of the appliance's local audio output.

In one option, each alert message that is sent to the designated appliance may include the soundfile that should be output, such that the alert message need not identify the alert type. Accordingly, the operations may further include instructing the plurality of appliances to send alert messages to a designated appliance among the plurality of appliances for output of audible alerts in response to detecting an event associated with an alert type, wherein each alert message sent by one of the appliances includes a soundfile that is assigned to the alert type detected by the appliance. Still further, the operations may include instructing the designated appliance to output an audible alert in response to receiving an alert message from any of the appliances, wherein the designated appliance includes an audio output component, and wherein the audible alert is output through the audio output component using the soundfile received in the alert message.

In another option, each alert message that is sent to the designated appliance may identify the appliance that is sending the alert message and may identify an alert type. In this option, the designated appliance may store a copy of the soundfiles that have been assigned to each combination of appliance identifier and alert type, as well as a record of the association between each individual soundfile and a combination of appliance identifier and alert type that may be received in an alert message. In either option, the designated appliance may output the soundfile for a given appliance alert in response to receiving the alert message. Accordingly, the operations may include sending the plurality of soundfile groups to a designated appliance among the plurality of appliances. The operation may further include instructing the plurality of appliances to send alert messages to the designated appliance for output of audible alerts in response to detecting an event associated with an alert type, wherein each alert message identifies an alert type and the appliance sending the alert message, and instructing the designated appliance to output an audible alert through an audio output component of the designated appliance in response to receiving an alert message from any of the other appliances, wherein the designated appliance can produce an audible alert through the audio output component using the soundfile that is assigned to the appliance and the alert type identified in the received alert message. Without limitation, the designated appliance may be a smart speaker or a computer. Furthermore, each appliance may store a lookup table that identifies, for each alert type, the soundfile that is assigned to the alert type for the particular appliance.

In some embodiments, a main control process may alter the use of the sounds/tones among one or more of the networked appliances in response to a change in conditions. The main control process may be executed by a main appliance, such as a dedicated main appliance within the same network as the networked appliances, or a selected one of the networked appliances that has been designated as the main appliance. The main appliance should have sufficient processing and memory capacity, as well as network bandwidth, to support communications with the other networked appliances with substantial reliability and without significant latency. In one non-limiting example, a main appliance may execute a control process that includes or accesses a clock, where the control process may identify "quiet times" during which audible alerts should be muted, shortened, changed or silenced. In one specific implementation, the control process may switch a first (daytime) sound palette to a second (nighttime) sound palette that is more subtle that the first sound palette during a designated quiet period of time. For example, the appliance might use a bright string quartet sound to output audible alerts during the day, but might use a soft, dulcet marimba sound to output audible alerts in the evening. This may be combined with other smart home and/or artificial intelligence (AI) techniques. For example, a home with a "smart" baby monitoring system might signal the main appliance to silence or mute alerts when a baby is sleeping during the day. According to some embodiments, the operations may include instructing, in response to detecting a first condition, each appliance to automatically modify the volume of the audible alert, wherein the first condition is a current time falling within a predetermined range of time and/or receiving a naptime signal from a baby monitor. According to other embodiments, the operations may include instructing, in response to detecting a first condition, each appliance to automatically switch from a first soundfile group having a first plurality of soundfiles with a first timbre to a second soundfile group having a second plurality of soundfiles with a second timbre.

In some embodiments, the use of audible alerts using sound palettes may be combined with voice and/or text notifications. For example, a change in the operating status of a given appliance may result in an audible output from the given appliance and/or connected smart speaker, as well as the output of an automated text/SMS/push notification or other voice or text message indicating the updated status for the appliance. In one option, the automated notifications may be user-selectable through a settings menu and perhaps temporarily enabled to assist a person to "learn" the meaning of the various audible alerts. Specifically, the user may more or less simultaneously hear an audible message and receive a text notification on their mobile or wearable device so that the association between the audible sounds and the underlying appliance identity and/or operating status change. In some embodiments, the operations may include receiving an alert message from a particular one of the appliances identifying the particular appliance and an alert type associated with an event detected by the particular appliance, and sending a notification to a designated user device in response to receiving the alert message, wherein the notification includes a verbal and/or textual identification of the particular appliance and the alert type identified in the alert message.

In some embodiments, the sound palettes may include premium sound palettes that may be purchased and made available to the main appliance. For example, an application server that enables access to sound palettes may include an online store that sells the right to download a premium sound palette. Optionally, the application server may implement a "freemium" model in which certain basic sound palettes may be accessed and downloaded without cost while the premium sound palettes can only be downloaded for a price. The premium sound palettes may be distinct from the basic sound palettes by one or more characteristic, such as the extent to which the sounds are exotic or unusual, contain famous or copyrighted works, use a particular digital audio coding format or quality, and/or are authored by known artists or celebrities.

Terminology used in this description follows the plain and ordinary meaning of terms as they are understood by a person skilled in the art. However, for the purpose of clarity, the following terms are set out as follows:

The term "musical key" refers to a group of pitches, or scale, which forms the basis of a music composition.

The term "melody" refers to a linear succession of musical tones, including a combination of pitch and rhythm.

The term "tempo" refers to a speed or pace, often described in beats per minute.

The term "rhythm" refers to the way in which one or more unaccented beats are grouped in relation to one or more accented beats.

The term "harmony" refers to the individual sounds with consonant or dissonant intervals when heard simultaneously.

The term "timbre" refers to the perceived sound quality of a musical note, sound or tone. Timbre may distinguish between different types of sound production, such as voices and various musical instruments.

The term "music genre" is a conventional category that identifies some pieces of music as belonging to a shared tradition or set of conventions.

The term "orchestration", including "instrumentation", refers to the use of different instruments to play the different parts of a musical work.

The term "counterpoint" refers to the relationship between melodic lines.

The term "common" means belonging to or shared by two or more individual things or by all members of a group.

The term "set" (noun) refers to one or more things of the same kind that are used together.

The foregoing program instructions of the computer program products may be implemented in an apparatus including a processor and a non-volatile storage device. For example, the apparatus may include a non-volatile storage device storing the program instructions, and at least one processor configured to process the program instructions, wherein the program instructions are configured to, when processed by the at least one processor, cause the apparatus to perform various operations. The apparatus may store any of the program instructions described herein and may perform any of the operations described herein. Accordingly, a separate description of the program instructions may not be duplicated in the context of an apparatus.

Figure 1:
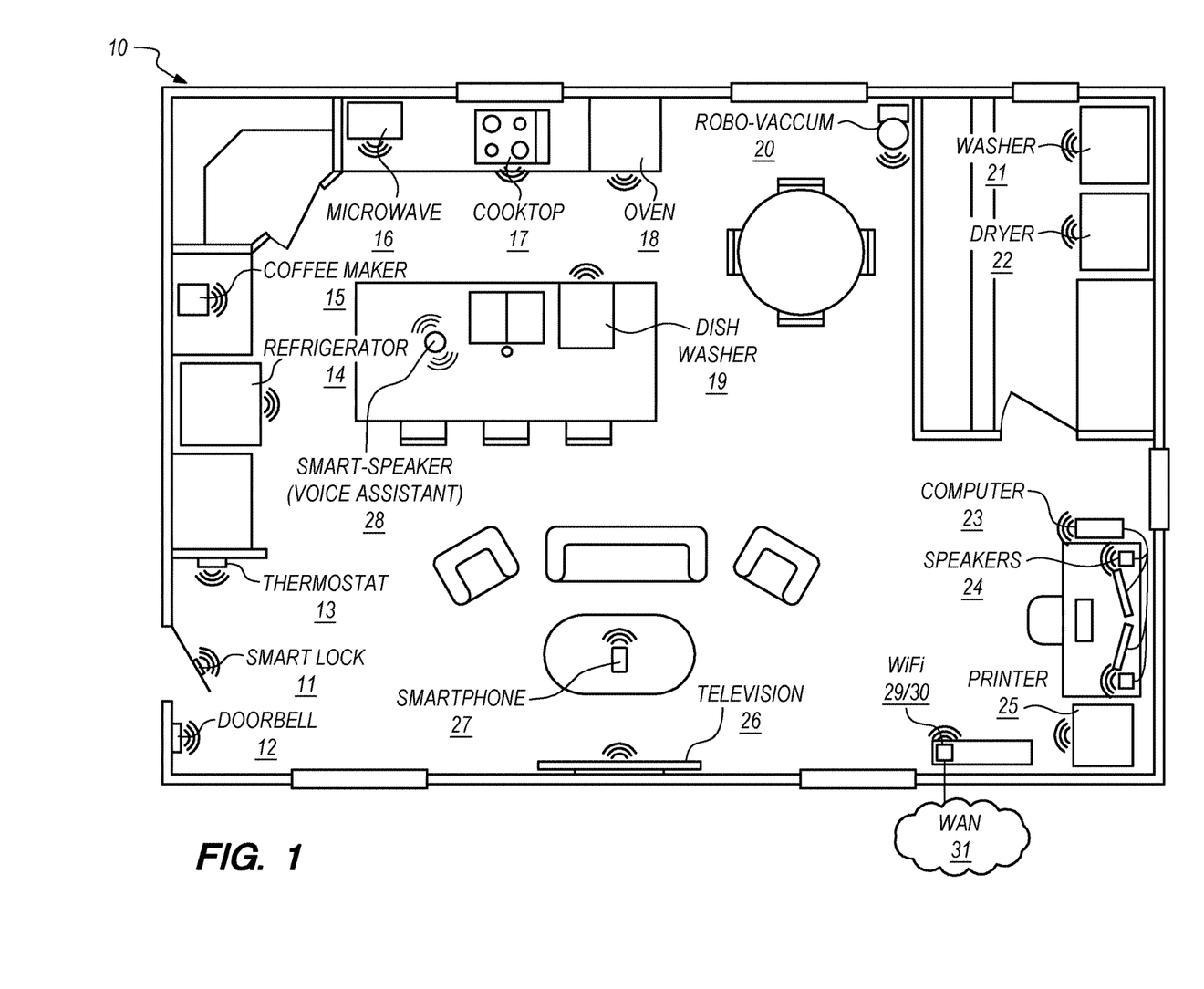
FIG. 1 is a floorplan of a living space that includes numerous appliances that produce audible alerts.

FIG. 1 is a floorplan of a residential living space 10 that includes numerous appliances that produce audible alerts. A front door area includes a smartlock 11, a doorbell 12 and a thermostat 13. A kitchen area includes a refrigerator 14, coffee maker 15, microwave oven 16, cooktop 17, standard oven 18 and dishwasher 19. A dining area includes a robotic vacuum 20. A laundry room includes a washer 21 and a clothes dryer 22. A home office area includes a computer 23, speakers 24, and printer 25. A family room area includes a television 26 and a smartphone 27. A smart speaker 28 is somewhat centrally located in the kitchen area. All of the foregoing appliances 11-28 may communicated in a wireless local area network by connecting with a Wi-Fi box 29 that is coupled via a router 31 to an wide area network (WAN) 30. Other appliances may be included or excluded from the residential living space 10 but two or more of the appliances may be heard from a single location within the residential living space 10. Without requiring that every appliance be heard from every location, each of the appliances 11-29 are in the same local area network (LAN) and may also be considered to be colocated by virtue of these close proximity within the residential living space 10. In accordance with various embodiments, the smartphone 27 and/or computer 23 may be preferred choices for serving as a main appliance that makes soundfile selections and assignments, and the smartphone 27 and/or smart speaker 27 may be preferred choices for servicing as a designated appliance for outputting audible alerts or notifications.

Figure 2:
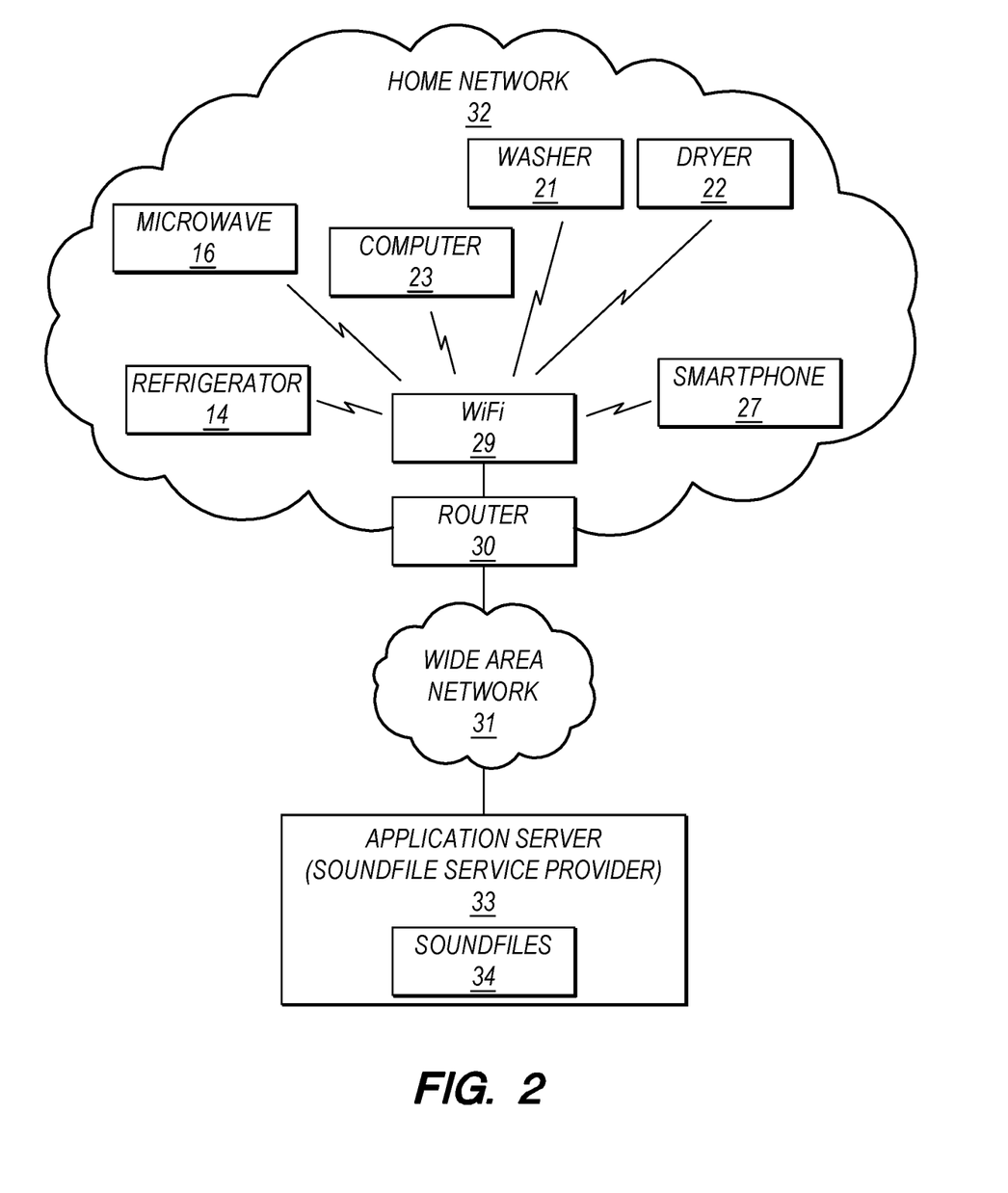
FIG. 2 is a diagram of appliances in a home network, where at least one of the appliances is capable of downloading soundfiles from a remote application server.

FIG. 2 is a diagram of certain appliances in a home network, where at least one of the appliances is able to download soundfiles from a remote application server. In this example, the home network 32 includes the refrigerator 14, microwave 16, washer 21, dryer 22, computer 23, smartphone 27 and Wi-Fi box 29. The Wi-Fi box 29 is connected to, or includes, a router 30 for connecting to a wide area network (WAN) 31, such as the Internet. Accordingly, appliances in the home network 32 may communicate with an application server 33 which stores various soundfiles 34. With appropriate credentials or privileges, at least one of the appliances, such as the computer 23 or smartphone 27, may access the application server 33 to download one or more soundfiles 34. Optionally, the application server 33 may include a web server and the computer may execute a web browser to download selected soundfiles 34.

Figure 3:
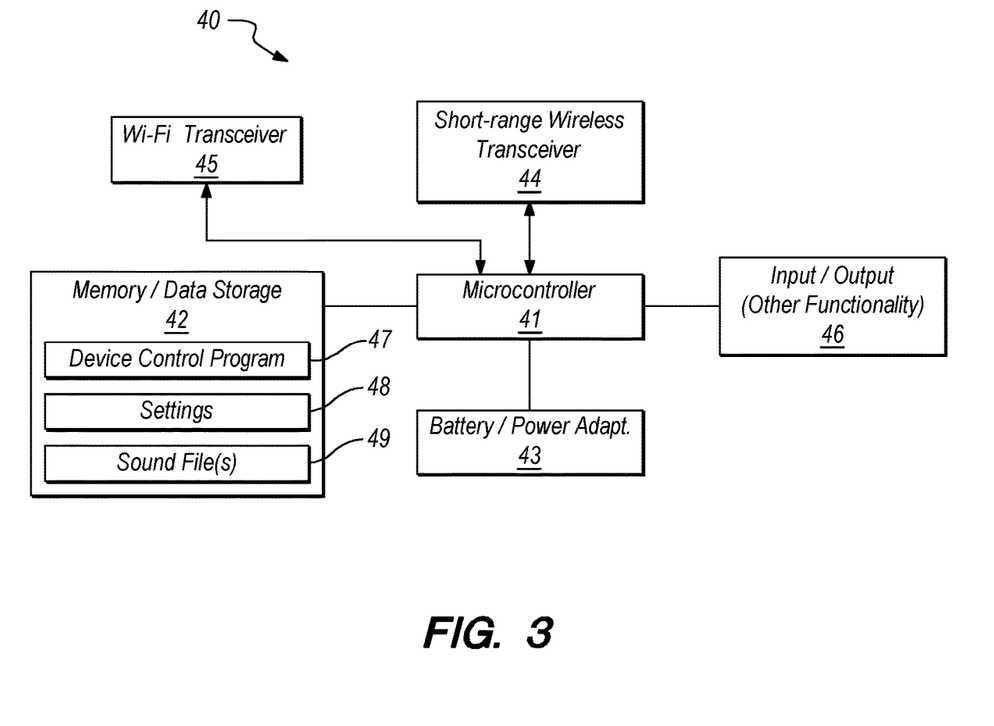
FIG. 3 is a diagram of a first appliance.

FIG. 3 is a diagram of a first appliance 40, which may be representative of various appliances in the residential living space 10. For example, the appliance 40 may be representative of the coffee maker 15, the thermostat 13 or the smart lock 11. The appliance 40 may include a microcontroller/processor 41, memory 42, a battery 43 or other power source, a short-range wireless transceiver 44 (perhaps Bluetooth), a Wi-Fi transceiver 45, and an input/output component(s) 46 (i.e., a sensor or motor) or other functionality. The battery/power source 43 provides power to each of the other components and may allow the appliance 40 to be mobile. The microcontroller/processor 41 may access the memory 42 to read and/or write data and/or program instructions, and may control use of the short-range wireless transceiver 44, the Wi-Fi transceiver 45, and the input/output component(s) 46. In the example where the appliance 40 is a coffee maker, the input/output component(s) 46 may include a heater, a water pump or valve, and a temperature sensor. In the example where the appliance 40 is a smart lock, the input/output component(s) 46 may include a deadbolt actuator and a keypad. Depending upon the task performed by the appliance 40, the memory 42 may include a device control program 47 including program instructions that may be executed by the microcontroller 41 to cause the performance of various operations. The memory 42 may also store settings 48 that may be modified by the user to affect how the device control program 47 operates. For example, the settings 48 may describe various alert conditions or how to respond to alert conditions. Various soundfiles 49 are also stored in the memory 42 or a separate data storage device (not shown). Either the settings or the soundfiles may further include a lookup table or other data structure indicating which soundfile is to be output in response to detecting a particular event or condition associated with a given alert type.

Figure 4:
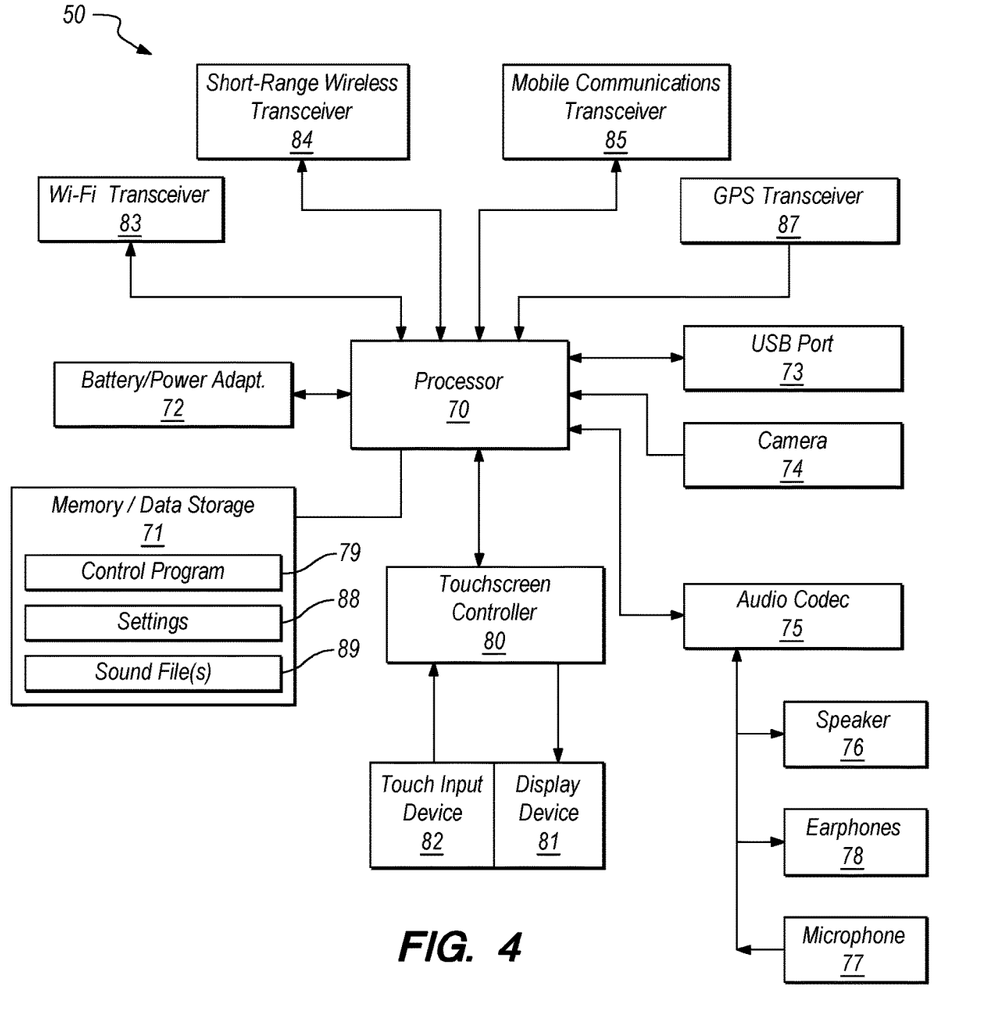
FIG. 4 is a diagram of a second appliance.

FIG. 4 is a diagram of a second appliance 50, which may be representative of the smartphone 27 or the refrigerator 14. The second appliance 50 may include a processor 70, memory or data storage device 71, a battery (or other power source) 72, a universal serial bus (USB) port 73, a camera 74, and an audio codec 75 coupled to a built-in speaker 76, a microphone 77, and an earphone jack 78. The second appliance 50 may further include a touchscreen controller 80 which provides a graphical output to the display device 81 and an input from a touch input device 82. Collectively, the display device 81 and touch input device 82 may be referred to as a touchscreen.

The second appliance 50 may also include a short-range wireless transceiver 84, a wireless local area network transceiver ("Wi-Fi transceiver") 83, a mobile communication transceiver 85 for communication with a cellular communication network, and a global positioning system (GPS) transceiver 87. Accordingly, the Wi-Fi transceiver 83 enables the formation of a wireless local area network connection with the Wi-Fi box 29 of FIGS. 1 and 2.

The memory 71 may store one or more applications including program instructions that are executable by the processor 70. Such applications may include an operating system and applications that may generate an audible alert. Depending upon the task performed by the second appliance 50, the memory 71 may include a device control program 79 including program instructions that may be executed by the processor 70 to cause the performance of various operations. The memory 71 may also store settings 88 that may be modified by the user to affect how the device control program 79 operates. For example, the settings 88 may describe various alert conditions or how to respond to alert conditions. Various soundfiles 89 are also stored in the memory 71 or a separate data storage device (not shown). Either the settings or the soundfiles may further include a lookup table or other data structure indicating which soundfile is to be output in response to detecting a particular event or condition associated with a given alert type.

Where the second appliance 50 is a smartphone that is being used as a main appliance, the control program 79 may further include program instructions for selecting soundfiles, downloading soundfiles, assigning soundfiles to other appliances, sending the soundfiles to the assigned appliances, and any other operation necessary to perform one or more of the disclosed embodiments.

Figure 5:
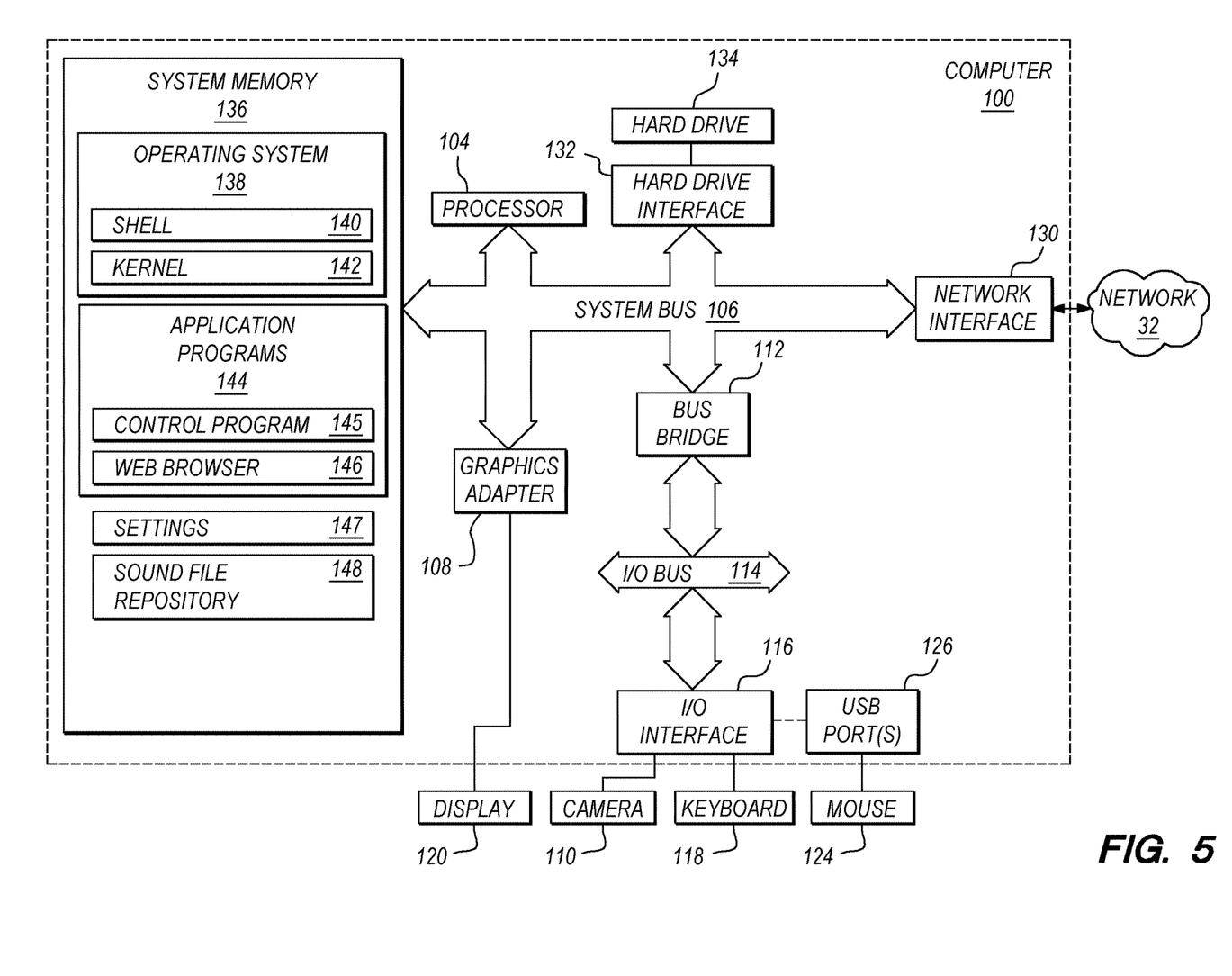
FIG. 5 is a diagram of a third appliance.

FIG. 5 is a diagram of a computer 100, which may also be representative of the architecture or configuration of a third appliance, such as the computer 23 of FIGS. 1 and 2, and/or the application server 33 of FIG. 2. The computer 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a camera 110, a keyboard 118 (such as a touch screen virtual keyboard), and a USB mouse 124 via USB port(s) 126 (or other type of pointing device, such as a trackpad). As depicted, the computer 100 is able to communicate with other appliances or devices via the network 32 using a network adapter or network interface controller 130. For example, the computer 100 may communicate with the application server 33 and appliances shown in FIG. 1.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. The hardware elements depicted in the computer 100 are not intended to be exhaustive, but rather are representative. For instance, the computer 100 may include non-volatile memory and the like.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management. As shown, the computer 100 includes application programs 144 in the system memory of the computer 100, including, without limitation, a control program 145 including program instructions that may be executed by the processor 70 to cause the performance of various operations according to embodiments disclosed herein, and a web browser 146. The web browser 146 may be used, in some embodiments, to interface with the application server 33 of FIG. 2.

The memory 144 may also store settings 147 that may be modified by the user to affect how the device control program 145 operates. For example, the settings 147 may describe various alert conditions or how to respond to alert conditions. Various soundfiles 148 are also stored in the memory 136 or a separate data storage device, such as the hard drive 134. Either the settings 147 may further include a lookup table or other data structure indicating which soundfile is to be output in response to detecting a particular event or condition associated with a given alert type. It should be understood that where the computer 100 is being used as a main appliance, the control program 145 may further include program instructions for selecting soundfiles, downloading soundfiles, assigning soundfiles to other appliances, sending the soundfiles to the assigned appliances, and any other operation necessary to perform one or more of the disclosed embodiments.

Figure 6:
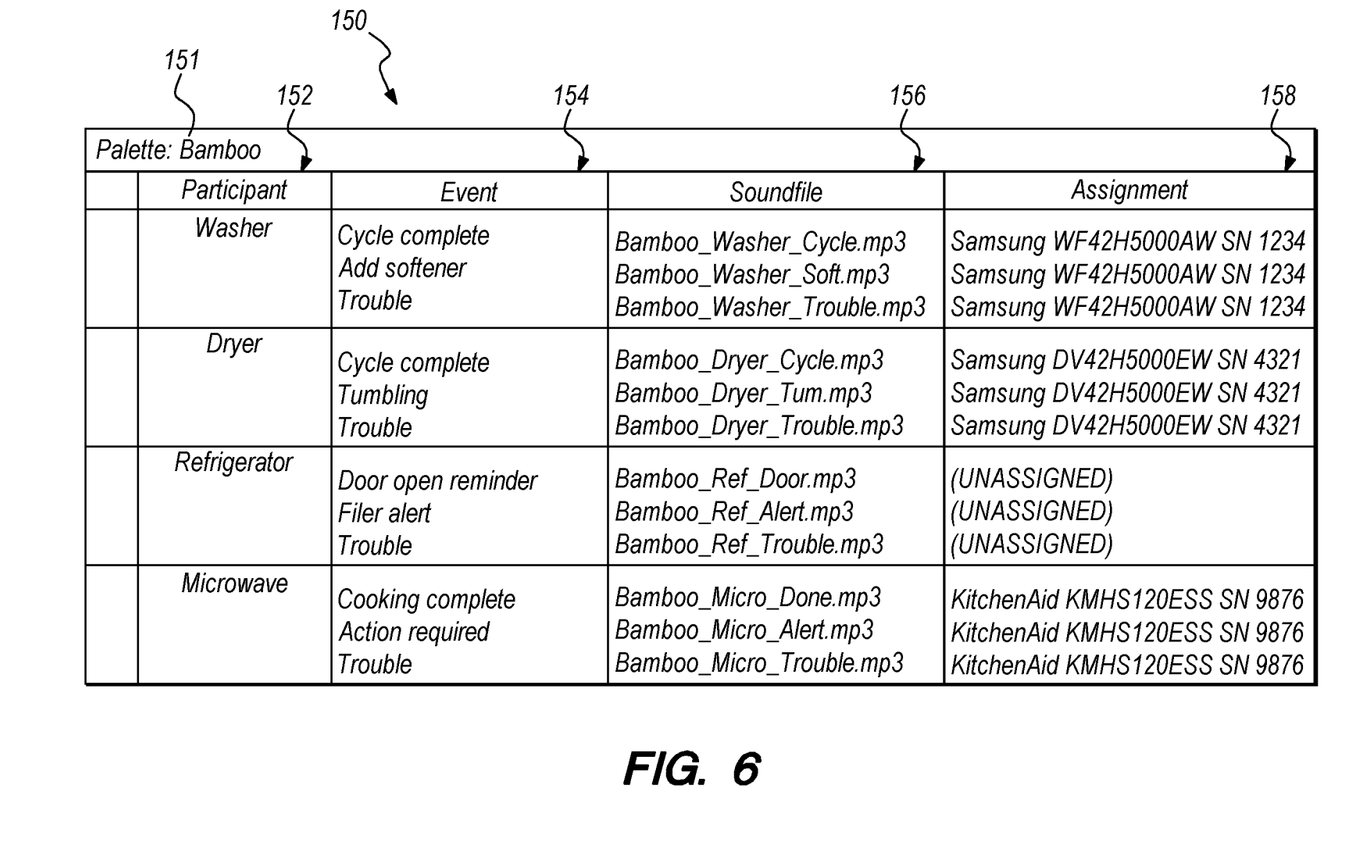
FIG. 6 is a table illustrating assignment of soundfiles to various appliances.

FIG. 6 is a table 150 illustrating how a main appliance may assign soundfiles to various appliances. In this illustration, a main appliance has already determined that there are four colocated appliances, including a washer, dryer, refrigerator and microwave (see column 152). The main appliance should also store an IP address and/or MAC address for each appliance to facilitate communication with each appliance over a local area network. Furthermore, the main appliance has further determined that each of the appliances may detect three events or alert conditions that should result in an audible alert (see column 154). Either applying default assignments or user-selected assignments, each event in column 154 has been assigned a soundfile in column 156. The assignment is illustrated by showing the event name (from column 154) in the same row or record) with the soundfile name (from column 156). The specific name of the appliance (i.e., manufacturer and model type or serial number) to which the soundfile is assigned is shown in column 158.

In this non-limiting illustration, a sound palette named "Bamboo" (see 151) has been selected for use by the appliances (see 14, 16, 21, 22) in the home network 32 of FIG. 2. A soundfile group "Bamboo_Washer" has been assigned to the Washer, such that detecting a "cycle complete" event will cause output of the soundfile "Bamboo_Washer_Cycle.mp3", detecting an "Add softener" event will cause output of the soundfile "Bamboo_Washer_Soft.mp3", and detecting a "Trouble" event will cause output of the soundfile "Bamboo_Washer_Trouble.mp3." Similarly, a soundfile group "Bamboo_Dryer" has been assigned to the Dryer, such that detecting a "cycle complete" event will cause output of the soundfile "Bamboo_Dryer_Cycle.mp3", detecting a "Tumbling" event will cause output of the soundfile "Bamboo_Dryer_Tum.mp3", and detecting a "Trouble" event will cause output of the soundfile "Bamboo_Dryer_Trouble.mp3." The assignment of the other soundfile groups "Bamboo_Ref" and "Bamboo_Micro" are handled in a corresponding manner.

However, note that each of the appliances in table 150 include a "Trouble" event or alert condition. In such an instance, the soundfile assigned to the event may have a common set of sound attributes to signify the alert type "Trouble". In some embodiments, each soundfile within the sound palette "Bamboo" may have a first common set of sound attributes so that the audible alerts within the home network sound good together. Each soundfile within the soundfile groups ("Bamboo_Washer", "Bamboo_Dryer", "Bamboo_Ref" and "Bamboo_Micro") of the sound palette "Bamboo" has a second common set of sound attributes to identify the appliance that is outputting the audible alert. However, the soundfiles within the soundfile group have a variation of the second common set of sound attributes that is unique among the plurality of soundfile groups within the sound palette. Each soundfile within a soundfile group has a unique variation of a third common set of sound attributes.

As a first non-limiting example, the soundfiles within the sound palette named "Bamboo" might have a common timbre produced by a marimba. The sound palette "Bamboo" may have multiple soundfile groups, wherein each soundfile within the soundfile group may use a first short melody sequence to uniquely identify each appliance followed by a second short melody sequence to uniquely identify an event or alert type. So, if the washer was identified by a four note melody (C4, E4, G4, D5) and a cycle complete alert was a three note melody (C5, C4, C3), then the soundfile for a washer cycle complete alert might include a marimba playing C4, E4, G4, D5, C5, C4, C3. If the dryer was identified by the four note melody (C4, D4, E4, G4), then the dryer cycle complete alert might be C4, D4, E4, G4, C5, C4, C3.

As a second non-limiting example, the soundfiles within a sound palette named "Drum Corp" might have a common tempo, such as 100 beats per minute. The sound palette "Drum Corp" may have multiple soundfile groups, wherein each soundfile within the soundfile group may use a common timbre (percussion instruments only) to uniquely identify each appliance. Each soundfile may then use a rhythm to signify the type of event or alert detected by the appliance. So, if the washer was identified by a bass drum and a cycle complete alert was identified by a four beat straight quarter note rhythm, then the soundfile for a washer cycle complete alert might be a bass drum playing a four beat straight quarter note rhythm. If the dryer was identified by a steel drum, then the dryer cycle complete alert might be a steel drum playing a four beat straight quarter note rhythm. Optionally, a dryer trouble alert might be a steel drum playing an eight beat straight eighth note rhythm.

As a third non-limiting example, the soundfiles within the sound palette named "Marching Band" might have a common musical key. The sound palette "Marching Band" may have multiple soundfile groups, wherein each soundfile within the soundfile group may use a timbre (certain brass and woodwind instruments only) to uniquely identify each appliance. Furthermore, a melody may be used to uniquely identify an event or alert type. So, if the washer was identified by a trumpet and a cycle complete alert was a three note melody (C5, C4, C3), then the soundfile for a washer cycle complete alert might include a trumpet playing C5, C4, C3. If the dryer was identified by a clarinet, then the dryer cycle complete alert might be a clarinet playing C5, C4, C3.

As may be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It may be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It may be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations may be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:
    establishing network communication with a plurality of appliances over a local area network, wherein each appliance is a smart appliance including a processor, memory, a network interface, and a data storage device with capacity to store a plurality of soundfiles;
    accessing a sound palette including a plurality of soundfile groups, each soundfile group including a plurality of soundfiles;

wherein each soundfile within the sound palette has a first common set of sound attributes;
wherein, for each of the soundfile groups within the sound palette, each soundfile within the soundfile group has a second common set of sound attributes;
wherein, for each of the soundfile groups within the sound palette, each soundfile within the soundfile group has a variation of the second common set of sound attributes that is unique among the plurality of soundfile groups within the sound palette; and
wherein each soundfile within a soundfile group has a unique variation of a third common set of sound attributes;
assigning, for each of the appliances, one of the soundfile groups to the appliance, wherein each soundfile group is assigned to only one appliance;
assigning, for each of the assigned soundfile groups, one of the soundfiles of the soundfile group to an alert type, wherein each soundfile is assigned to only one alert type; and
sending, for each of the appliances, the assigned soundfile group to the appliance with identification, for each soundfile within the assigned soundfile group, of the alert type to which the soundfile is assigned.

2. The computer program product of claim 1, the operations further comprising:
discovering each of the plurality of appliances on the local area network; and
identifying, for each of the plurality of appliances, each alert type that the appliance outputs in response to detecting an event.

3. The computer program product of claim 1, the operations further comprising:
selecting one or more sound attributes for inclusion in the first common set of sound attributes, one or more sound attributes for inclusion in the second common set of sound attributes, and one or more attributes for inclusion in the third common set of sound attributes; and
producing the plurality of soundfiles, each soundfile including the first common set of sound attributes, the variation of the second common set of sound attributes that is unique to the soundfile group in which the soundfile is included, and the variation of the third common set of sound attributes that is unique to alert type to which the soundfile is assigned.

4. The computer program product of claim 1, wherein the variation of the second common set of sound attributes that is unique to a soundfile group signifies an appliance identity.

5. The computer program product of claim 1, wherein the unique variation of the third common set of sound attributes is associated with an alert type detected by the appliance.

6. The computer program product of claim 5, wherein the unique variation of the third common set of sound attributes signifies the same alert type for each of the soundfile groups.

7. The computer program product of claim 5, wherein two or more of the plurality of appliances have a common event type, and wherein each of the two or more appliances having the common event type include a soundfile having the same variation of the third common set of sound attributes to signify the common event type.

8. The computer program product of claim 1, wherein each soundfile within the soundfile group is designated for use as an audible alert in response to detecting a particular alert type.

9. The computer program product of claim 1, wherein each appliance stores a plurality of soundfile groups, each soundfile group being associated with a different sound palette.

10. The computer program product of claim 9, the operations further comprising:
receiving a user selection of the sound palette;
instructing each appliance to use a soundfile group associated with the sound palette selected by the user for audible alerts; and
preventing any two appliances from using the same soundfile group.

11. The computer program product of claim 1, wherein the plurality of appliances are colocated in a single residence.

12. The computer program product of claim 1, the operations further comprising:
establishing a connection with a remote application server storing a plurality of sound palettes, each sound palette including a plurality of soundfile groups, and each soundfile group including a plurality of soundfiles;
wherein, for each of the sound palettes, each soundfile within the sound palette has a first common set of sound attributes;
wherein, for each of the soundfile groups within each of the sound palettes, each soundfile within the soundfile group has a second common set of sound attributes;
wherein, for each of the soundfile groups within each of the sound palettes, each soundfile within the soundfile group has a variation of the second common set of sound attributes that is unique among the plurality of soundfile groups within the sound palette; and
wherein each soundfile within a soundfile group has a unique variation of a third common set of sound attributes;
selecting the sound palette from the plurality of sound palettes stored by the remote application server; and
downloading the plurality of soundfiles within the sound palette that has been selected.

13. The computer program product of claim 12, wherein two or more sound palettes of the plurality of sound palettes have a unique variation within the first common set of sound attributes.

14. The computer program product of claim 12, wherein two or more sound palettes of the plurality of sound palettes have at least one different sound attribute within the first common set of sound attributes.

15. The computer program product of claim 1, the operations further comprising:
establishing a connection with a remote application server storing soundfiles that can be used by an appliance to produce an audible alert;
providing the remote application server with an Internet Protocol address for use communicating with each of the appliances; and
identifying, for each of the appliances, a soundfile group to be used by the appliance; and
instructing the remote application server to send, for each of the appliances, the identified soundfile group to the appliance.

16. The computer program product of claim 1, the operations further comprising:
sending the plurality of soundfile groups to a designated appliance among the plurality of appliances;
instructing the plurality of appliances to send alert messages to the designated appliance for output of audible alerts in response to detecting an event associated with an alert type, wherein each alert message identifies an alert type and the appliance sending the alert message; and instructing the designated appliance to output an audible alert through an audio output component of the designated appliance in response to receiving an alert message from any of the other appliances, wherein the designated appliance can produce an audible alert through the audio output component using the soundfile that is assigned to the appliance and the alert type identified in the received alert message.

17. The computer program product of claim 1, wherein each appliance stores a lookup table that identifies, for each alert type, the soundfile that is assigned to the alert type for the appliance.

18. The computer program product of claim 1, the operations further comprising:

instructing the plurality of appliances to send alert messages to a designated appliance among the plurality of appliances for output of audible alerts in response to detecting an event associated with an alert type, wherein each alert message sent by one of the appliances includes a soundfile that is assigned to the alert type detected by the appliance; and instructing the designated appliance to output an audible alert in response to receiving an alert message from any of the appliances, wherein the designated appliance includes an audio output component, and wherein the audible alert is output through the audio output component using the soundfile received in the alert message.

19. The computer program product of claim 1, the operations further comprising:

instructing, in response to detecting a first condition, each appliance to automatically modify the volume of the audible alert, wherein the first condition is a current time falling within a predetermined range of time and/or receiving a naptime signal from a baby monitor.

20. The computer program product of claim 1, the operations further comprising:

instructing, in response to detecting a first condition, each appliance to automatically switch from a first soundfile group having a first plurality of soundfiles with a first timbre to a second soundfile group having a second plurality of soundfiles with a second timbre.

* * * * *